United States Patent [19]

Hashimoto

[11] Patent Number: 5,559,863
[45] Date of Patent: Sep. 24, 1996

[54] CAR TELEPHONE ACCESSORY DEVICE WITH TELEPHONE ANSWERING FUNCTION

[75] Inventor: Kazuo Hashimoto, Tokyo, Japan

[73] Assignee: Hashimoto Corporation, Tokyo, Japan

[21] Appl. No.: 361,420

[22] Filed: Dec. 22, 1994

[30] Foreign Application Priority Data

Dec. 28, 1993 [JP] Japan .................................. 5-348943

[51] Int. Cl.⁶ ....................................................... H04M 1/64
[52] U.S. Cl. ............................. 379/58; 379/67; 379/455; 379/446; 455/89; 455/90
[58] Field of Search ....................... 379/58, 59, 60, 379/61, 67, 426, 455, 454, 457, 446; 455/74, 89–90

[56] References Cited

U.S. PATENT DOCUMENTS

| | | | |
|---|---|---|---|
| 4,723,281 | 2/1988 | Peiker et al. | 379/58 X |
| 4,745,632 | 5/1988 | Duffy | 379/58 |
| 4,747,136 | 5/1988 | Kiesewetter | 377/455 |
| 5,303,288 | 4/1994 | Duffy et al. | 379/59 |
| 5,444,761 | 9/1995 | Nasashime | 379/58 |
| 5,499,292 | 3/1996 | Blonder et al. | 379/433 |

FOREIGN PATENT DOCUMENTS

| | | |
|---|---|---|
| 2181624 | 4/1987 | United Kingdom . |
| 2231237 | 11/1990 | United Kingdom . |
| 2272346 | 5/1994 | United Kingdom . |
| WO89/12937A1 | 12/1989 | WIPO . |

Primary Examiner—Curtis Kuntz
Assistant Examiner—Lisa M. Coward
Attorney, Agent, or Firm—Lowe, Price, LeBlanc & Becker

[57] ABSTRACT

The present invention is directed to enable a car telephone to receive incoming calls and a telephone answering device to be activated even though the ignition key is removed. A housing is fitted onto a car telephone cradle and a handset is placed on the top of the housing. When there is a call, a rotary arm which is coupled to a motor is moved, and a magnet attached to the tip of the rotary arm opens a reed relay, which corresponds to a hook switch to form a loop circuit. Then an outgoing message is transmitted via a speaker, and an incoming message from a caller is recorded via a microphone.

7 Claims, 4 Drawing Sheets

CAR TELEPHONE ACCESSORY DEVICE WITH TELEPHONE ANSWERING FUNCTION

TECHNICAL FIELD

This invention relates to mobile telephones, and particularly, an answering device for a car telephone.

BACKGROUND OF THE INVENTION

The present invention relates to a telephone answering device, in particular, a device in which a telephone answering function has been added to a car telephone.

Heretofore, technology that would have enabled the addition of a telephone answering function to a car telephone did not develop because the nature of a car telephone was such that it would be turned off when the owner left the car, or in other words, when he turned off the ignition and removed the key.

Lately, standard shapes and functions have become available for car telephones. In addition, considering that an environment is developing in which calls to a car telephone can be received if power to the car telephone is left on by removing the ignition key after turning it to an appropriate position, the present invention proposes as a task adding a telephone answering function to the car telephone so that messages which are received during the driver's absence can be recorded automatically, for up to two to three hours' absence from the car.

SUMMARY OF THE INVENTION

In consideration of the fact that car telephones generally sold at present are designed so that a loop circuit is engaged and disengaged by mutual interaction of a reed relay in the handset of car telephone and a magnet which is in a corresponding position inside the car telephone cradle, the present car telephone accessory device is fitted onto the car telephone cradle, and the handset of the car telephone is placed on the top of the accessory device. Consequently, when a call is received, as in a conventional telephone answering device, a loop circuit is formed, a pre-recorded outgoing message is transmitted, and the caller's voice is recorded. Such are the functions which are made possible by the present invention.

The present invention, which is comprised of a car telephone accessory device with telephone answering function, will be supplied with power even if the ignition key is being removed. Therefore, messages arriving at the car telephone will be recorded and can be listened to later.

DESCRIPTION OF THE PREFERRED EMBODIMENT

Figure 1:
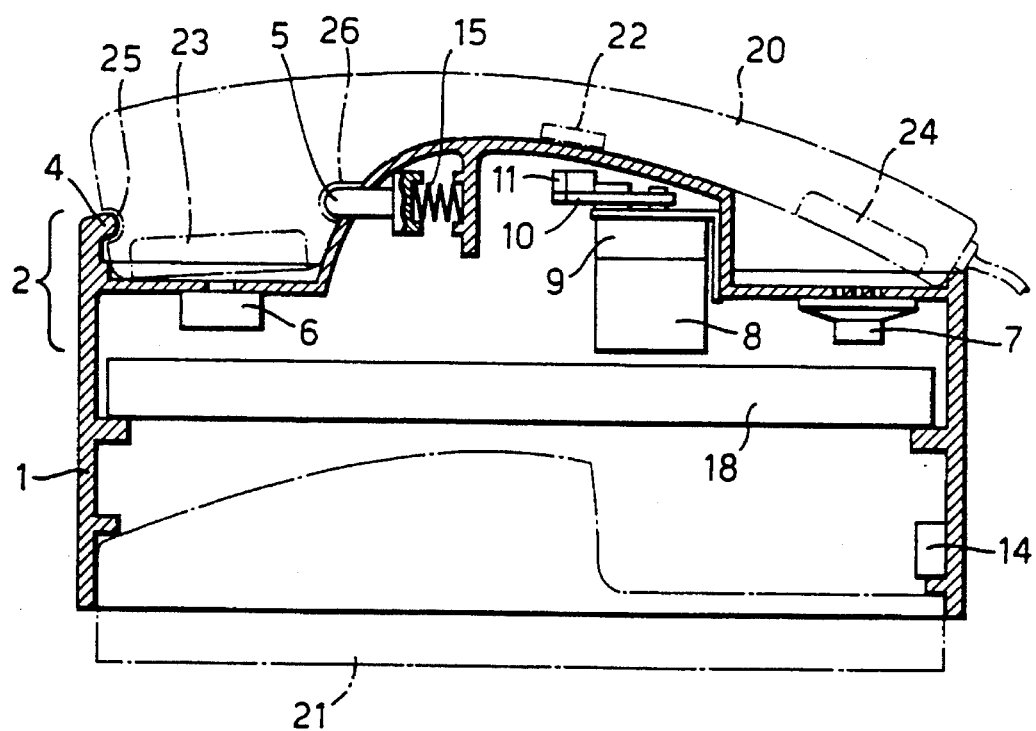
FIG. 1 is a cross-sectional view of an embodiment of the present invention.
Figure 2:
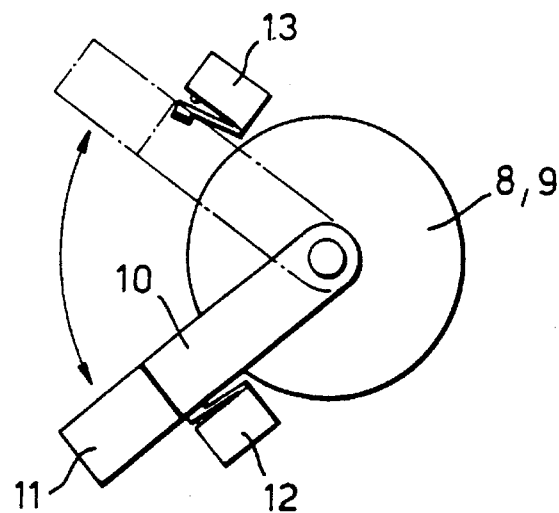
FIG. 2 is an enlarged top view of the motor unit.
Figure 3:
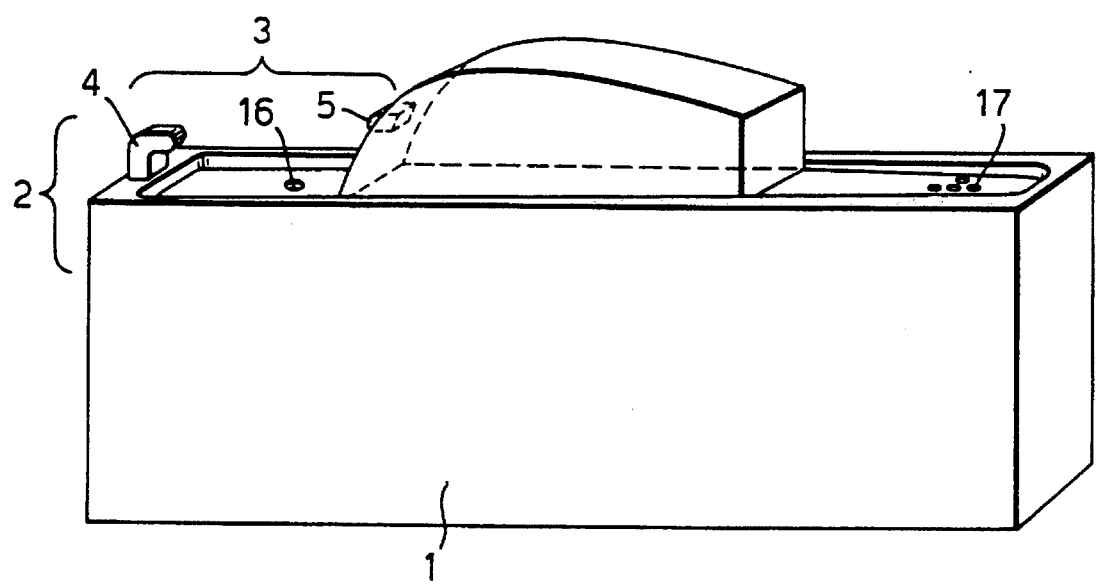
FIG. 3 is a perspective view of the exterior of the present invention.

FIG. 1 is a cross-sectional view of an embodiment of the present invention. FIG. 2 is an enlarged top view of the motor unit, which is shown in FIG. 1. FIG. 3 is a perspective view of the exterior of the present invention.

In FIG. 1, numeral 20 is the handset of a car telephone. Numeral 21 is the cradle of the car telephone. Numeral 22 is a reed relay built into handset 20. This relay serves as a magnetic induction switch for generating a discrimination signal indicating whether the car telephone is in an on-hook or off-hook condition. Numeral 23 is the earpiece of handset 20. Numeral 24 is the mouthpiece of handset 20. Numeral 25 is concavity A, which is provided on the top side of earpiece 23 of handset 20. Numeral 26 is concavity B, which is provided on the bottom side of earpiece 23 of handset 20.

Numeral 1 is the housing of the present device. Numeral 2 is the upper section of housing 1 which is used for cradling the aforementioned car telephone handset 20. (The stabilizing section, which stabilizes handset 20 when it is placed on the present device, is shown as numeral 3 in FIG. 3.) Numeral 4 is a fixed projection which is part of stabilizing section 3. Numeral 5 is a mobile projection which his also part of stabilizing section 3.

Numeral 6 is a microphone A which is located on the under surface of cradle section 2 of housing 1. Its position is opposite to the earpiece 23 of handset 20.

Numeral 7 is a speaker which is located on the under surface of cradle section 2 of housing 1. Its position is opposite to the mouthpiece 24 of handset 20. (Speaker holes for speaker 7 are shown as numeral 17 in FIG. 3.)

Numeral 8 is a direct current motor (hereinafter simply called motor 8). Numeral 9 is a speed reducer which is coupled to the rotating axle of motor 8.

Numeral 10 is a rotary arm, the end of which is fixed to the output axle of speed reducer 9. Numeral 11 is a magnet which is attached to the tip of rotary arm 10. Numeral 12 is limit switch A. Numeral 13 is limit switch B. Numeral 14 is microphone B for picking up ringing tones from the car telephone. Numeral 15 is a spring which pushes out mobile projection 5. Numeral 16 is a microphone hole for microphone 6. Numeral 18 is an IC board.

In order to install the present device, handset 20 of the car telephone should be first removed from car telephone cradle 21. Next, the bottom of housing 1 is fitted to car telephone cradle 21, and concavity 25 of the aforementioned handset 20 is fitted onto fixed projection 4. Here, if handset 20 is pressed onto cradle section 2 of housing 1, mobile projection 5, which is under slight pressure from spring 15, will be forced back until the handset 20 is pressed all the way into cradle section 2. When that happens, mobile projection will be able to slide into concavity 26 due to pressure from spring 15. Handset 20 will thus be stabilized in cradle section 2 of housing 1.

Figure 4:
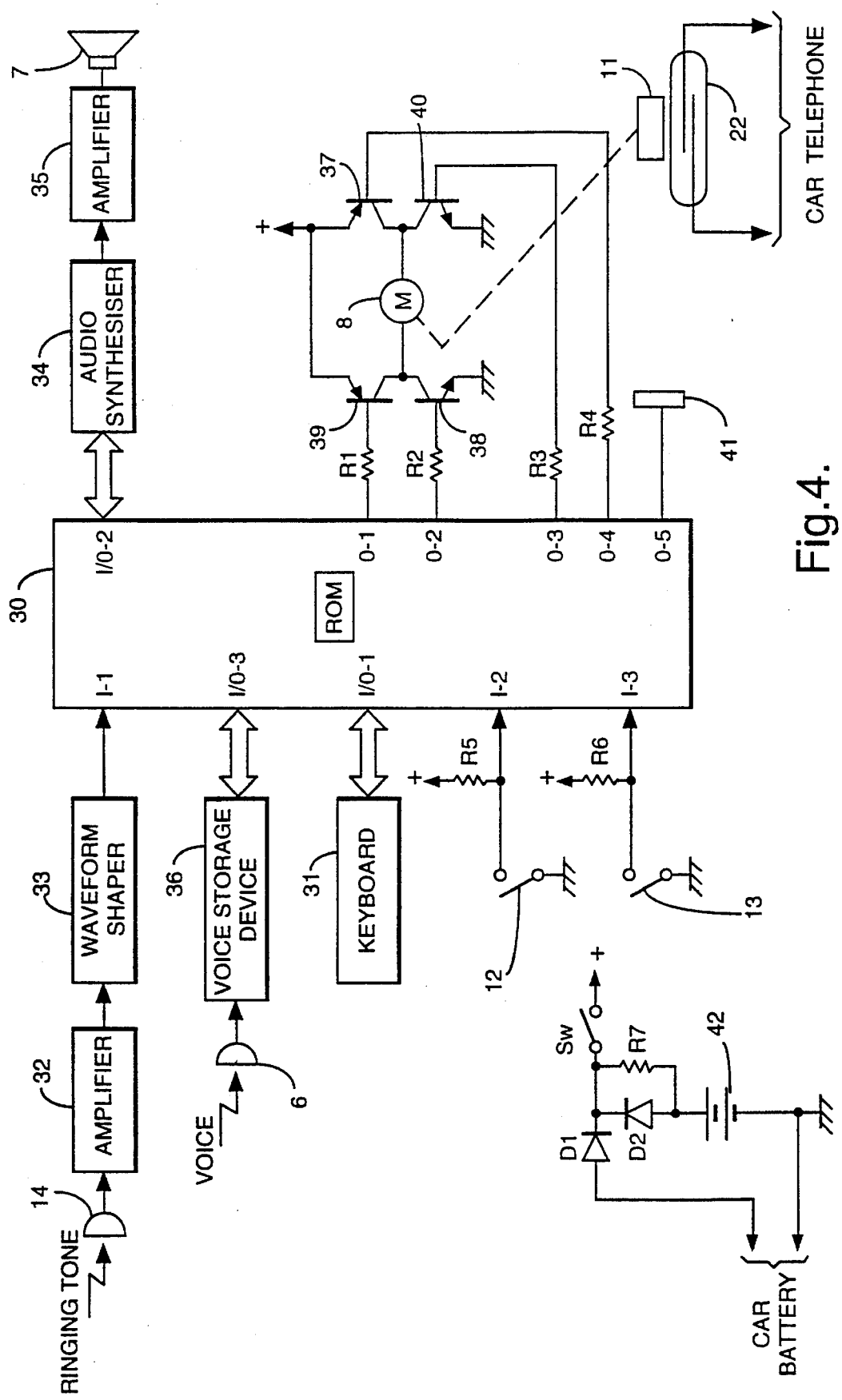
FIG. 4 is a block diagram showing the electronic circuits of an embodiment of the present invention.
Figure 5:
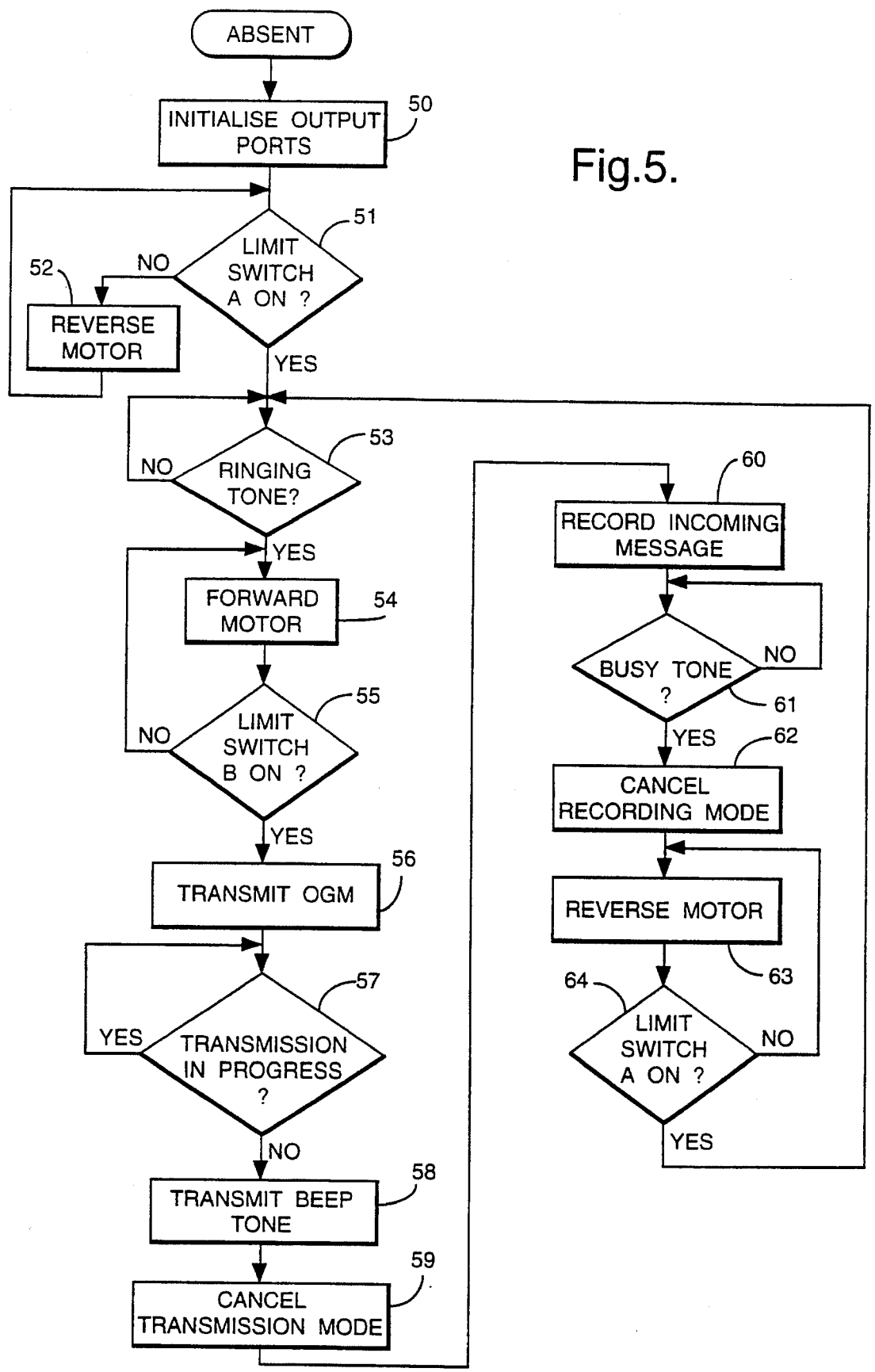
FIG. 5 is a flowchart illustrating operations of the present invention.

The following is an explanation with reference to the block diagram of FIG. 4 and the flowchart of FIG. 5.

In FIG. 4, microphone 6, speaker 7, motor 8, magnet 11, limit switch 12, and limit switch 13 are the same components as those in the mechanism described above.

Numeral 30 is a single chip microprocessor (CPU) which has a built-in ROM. The ROM contains the program which controls the CPU.

Symbols I-1 through I-3 are input ports. Symbols O-1 through O-5 are output ports. Symbols I/O-1 through I/O-3 are input/output ports. Numeral 31 is a keyboard for switching the operation modes of the present device, for example, to absent mode or playback mode. Numeral 32 is an amplifier which amplifies the ringing tones picked up by microphone 14. The output from amplifier 32 is converted to a digital bell signal by waveform shaper 33 and applied to input port I-1.

Numeral 34 is an audio synthesizer which is used for generating an outgoing message provided by factory. However, it is possible to use an outgoing message which is recorded by the user in IC memory or on magnetic tape. In this case, the audio synthesizer is not required.

Numeral 35 is an amplifier for amplifying the outgoing message. Its output is applied to speaker 7, which is coupled acoustically to handset 20.

Numeral 36 is a voice storage device for storing messages from callers which are picked up by microphone 6. Microphone 6 is acoustically coupled to handset 20. In the present embodiment, an IC memory is used, but a magnetic tape may be used as a substitute.

Numerals 37 through 40 are transistors for making motor 8 rotate forward and backward. Numeral 41 is a buzzer which uses intermittent signals to indicate that one or more messages have been recorded on the aforementioned voice storage device.

Numeral 42 is a battery for the present device which is charged by the car battery (not shown) through resistor R7 and diode D1. The diode D1 is for preventing discharge of battery 42. When the ignition key is removed, switch SW is closed and current flows to the aforementioned circuits.

In the present device which is constructed in the aforementioned manner, if the "Absent" key (not shown) on keyboard 31 is pressed, the subroutine shown in FIG. 5 is called.

At Step 50, output ports O-1 through O-4 are initialized to prevent motor 8 from operating. At Step 51, a test takes place to determine whether limit switch 12 is on.

During a normal standby condition of the present device, in which the device awaits ringing tones, the tip of rotary arm 10, which is connected to motor 8, has to keep limit switch 12 on. Magnet 11, which is attached to the tip of the rotary arm, is kept in the vicinity of reed relay 222. Therefore, reed relay 22 stays closed and an on-hook condition of the car telephone is maintained even though handset 20, which is placed on the upper part of housing 1 of FIG. 1, is not in close proximity to car telephone cradle 21.

However, if limit switch 12 is not in the on condition, (for example, if motor 8 had stopped in the middle of the previous operation of the present device, then rotary arm 10 would be midway between limit switches A and B), Step 51 will be negative. Then, at Step 52, motor 8 will rotate in a reverse direction. In other words, rotary arm 10 of FIG. 2 moves in a counterclockwise direction.

More specifically, when output port O-2 is at a high level and output port O-4 is at a low level, motor 8 receives current by means of the path comprising the direct current supply (+), transistor 37, motor 8 and transistor 38.

When limit switch 12 is turned on, Step 51 will become affirmative and the program advances to Step 53.

At Step 53, the present device is in the standby condition to await ringing tones, which are to be generated in response to an incoming call on the car telephone. Upon arrival of an incoming call, ringing tones will be detected via microphone 14, amplifier 32, waveform shaper 33 and input port I-1.

The program checks the period of the ringing tones to determine whether they are ringing tones. If there are, for example, three ringing tones, Step 53 will become affirmative and motor 8 will rotate in a forward direction (transistors 39 and 40 turn on). While rotary arm 10 of FIG. 2 moves in a clockwise direction, a test takes place via input port I-3 to determine whether or not limit switch 13 has turned on yet. Motor 8 operates until limit switch 13 turns on.

Magnet 11, which is attached to the tip of rotary arm 10, causes reed relay 22, which functions as a hook switch, to turn off before limit switch 13 is turned on. When reed relay 22 turns off, a conversation mode is established between the caller's telephone and the present device.

When limit switch 13 turns on, the program advances to Step 56 where art outgoing message from audio synthesizer 34 is selected in accordance with a command from input/output port. I/O-2, which also directs the commencement of outgoing message transmission.

The outgoing message is acoustically coupled to mouthpiece 24 of handset 20 via amplifier 35 and speaker 7 and transmitted to the caller.

At Step 57, a test is performed via input/output port I/O-2 to determine whether transmission is in progress. When the outgoing message transmission has ended, a beep tone is transmitted by audio synthesizer 34 and transmission mode is cancelled.

At Step 60, the program switches the present device to incoming message recording mode via input/output port I/O-3. Accordingly, a message from the caller is recorded on voice storage device 36 via microphone 6, which is acoustically coupled to handset 20.

During the recording, input/output port I/O-3 is switched to an input mode, whereby the incoming audio signals are monitored.

When the caller hangs up and the present device receives a busy tone (a dial tone in the U.S.), Step 61 will become affirmative.. The recording mode will then be cancelled at Step 62. The aforementioned motor 8 will rotate in a reverse direction until limit switch 12 is turned on (Steps 63 and 64). Then the program returns to Step 53, where the device is restored to the standby condition.

At this time, magnet 11 returns to its original position which causes reed relay 22 in handset 20 to close, whereby the car telephone is set to an on-hook condition.

It may be noted that resetting to the standby condition does not need to be in response to detection of the aforementioned busy tone. It could be in accordance with a timer. Also, it is possible to replace speaker, microphone and reed relay with equivalent elements.

With a conventional car telephone, if a driver leaves a car (for example, for carrying out sales activities for two or three hours), he has no choice but to rely on a pager or a portable telephone. There are no means which are equivalent to a telephone answering device.

By using the present invention, however, it is possible to receive calls even if the ignition key is removed. A telephone answering device is activated at such time and messages are recorded while the driver is away from the car. When the driver returns, he can listen to the messages. Therefore, the present invention is of great practical value.

While the present invention has been described in a specific embodiment, it is evident that many alternatives, modifications and variations will be apparent to those skilled in the art.

What is claimed is:

1. A car telephone accessory device with telephone answering function comprising:

a box-shaped housing being fitted onto a car telephone cradle;

a cradle section of said housing having a shape such that a handset for said car telephone can be stably placed thereon;

a magnet being installed inside said cradle section in such a manner that said car telephone is maintained in an on-hook condition by a reed relay, said reed relay being built into said handset for controlling on- or off-hook condition of said car telephone;

supporting means attached to said magnet in order to facilitate movement of said magnet to a position where said reed relay sets said car telephone to an off-hook condition;

means for detecting a ringing signal;

means for generating an outgoing message;

voice storage means for storing incoming messages;

moving means for moving said magnet;

circuit means for rotating said moving means in response to detection of a ringing signal;

a limit switch being installed, for purposes of terminating operation of said circuit means, at such a position that said limit switch operates when said magnet moves in an arc of predetermined angle;

a first transducing element being installed near a mouthpiece of said handset in order to transmit an outgoing message; and a second transducing element being installed near an earpiece of said handset in order to record a callers' voice;

wherein said magnet, which moves in response to detection of a ringing signal, causes said reed relay to cancel the on-hook condition of said car telephone, an outgoing message is transmitted to a caller by means of said first transducing element after said car telephone is set to conversation mode, the caller's voice in response to the outgoing message is stored in said voice storage device by means of said second transducing element.

2. A car telephone accessory device with telephone answering function as set forth in claim 1, wherein said housing is constructed so that the bottom of said housing is fitted to said car telephone cradle, said handset can be placed on a top of said housing, a mobile projection and a stabilizing projection are provided in order to stabilize said handset on said cradle section of said housing, said first transducing element is installed near said mouthpiece of said handset in order to transmit an outgoing message, and said second transducing element for picking up incoming messages is installed near said earpiece of said handset.

3. The car telephone accessory device of claim 1, wherein said magnet and said reed relay form a loop circuit.

4. The car telephone accessory device of claim 1, wherein said moving means comprises a rotary arm having one end coupled to a motor, and another end supporting said magnet.

5. The car telephone accessory device of claim 1, wherein said circuit means comprises:

a first transistor;

a second transistor coupled to said first transistor;

a third transistor coupled to said first transistor; and a fourth transistor coupled to said third transistor, said moving means having a first terminal coupled to said first and second transistors, and a second terminal coupled to said third and fourth transistors.

6. The car telephone accessory device of claim 1, further comprising means for supplying power to the car telephone accessory device when ignition of a car in which the accessory device is installed is off, said power supplying means being recharged by a battery of the car when the ignition is on.

7. The car telephone accessory device of claim 1, wherein said moving means moves said magnet to close proximity of the reed relay to maintain the on-hook condition when the car telephone accessory device is activated.

* * * * *